United States Patent [19]

Kiser

[11] Patent Number: 4,696,720
[45] Date of Patent: Sep. 29, 1987

[54] REMOVAL OF WATER FROM AQUEOUS ALCOHOL MIXTURES

[75] Inventor: Donald L. Kiser, Muscatine, Iowa

[73] Assignee: Grain Processing Corporation, Muscatine, Iowa

[21] Appl. No.: 862,049

[22] Filed: May 12, 1986

[51] Int. Cl.$^4$ ............................................. B01D 15/00
[52] U.S. Cl. ........................................ 203/19; 203/41; 203/DIG. 13; 521/26; 568/916; 568/917
[58] Field of Search ............. 203/18, 19, 41, DIG. 13; 521/26; 568/916, 917

[56] References Cited

U.S. PATENT DOCUMENTS

| 1,676,735 | 7/1928 | Keyes | 203/19 |
|---|---|---|---|
| 3,122,486 | 2/1964 | Skarstrom | 203/18 |
| 3,132,079 | 5/1964 | Epperly et al. | 203/41 |
| 3,235,610 | 2/1966 | Wymore | 55/33 |
| 3,408,267 | 10/1968 | Miller et al. | 203/19 |
| 3,691,728 | 9/1972 | Vautrain et al. | 55/33 |
| 3,700,592 | 10/1972 | De Pree | 521/26 |
| 4,051,079 | 9/1977 | Melby | 521/26 |
| 4,273,621 | 6/1981 | Fornoff | 203/19 |
| 4,319,057 | 3/1982 | Kiser | 568/916 |
| 4,333,740 | 6/1982 | Priegnitz | 44/56 |
| 4,345,973 | 8/1982 | Ladish et al. | 203/19 |
| 4,469,805 | 9/1984 | Kofke, Jr. | 502/33 |
| 4,496,667 | 1/1985 | Reichgott et al. | 521/26 |

Primary Examiner—S. Leon Bashore
Assistant Examiner—V. Manoharan
Attorney, Agent, or Firm—Neuman, Williams, Anderson & Olson

[57] ABSTRACT

The present invention involves a process for removing water from mixtures of alcohols and water by contacting such a mixture with an ion exchange resin of either the cation or anion type. Prior to use for alcohol dehydration, the ion exchange resin itself is dehydrated if necessary or desired by contacting it with methanol, propanol, isopropanol, acetone or other like low molecular weight hydrophilic solvents. After use for alcohol dehydration, the ion exchange resin is regenerated by contacting it with these regenerating agents.

9 Claims, No Drawings

REMOVAL OF WATER FROM AQUEOUS ALCOHOL MIXTURES

This invention relates to methods for removing water from alcohols.

For use in certain applications alcohols must be substantially free of water. For example, anhydrous ethanol is used as an automotive fuel by itself or, more usually, as a gasohol blend with gasoline. For such uses, it is desired that the alcohol be anhydrous, i.e., substantially free of water.

Ethanol is commonly produced from corn by fermentation processes to produce an aqueous mixture containing at most about 12% ethanol. Distillation can then increase the alcohol content to about 95% and to further increase the alcohol content azeotropic distillation using a third component, such as an organic solvent, is commonly employed. Azeotropic distillation is costly and for this and other reasons prior art workers have directed attention to other methods for dehydrating alcohols.

U.S. Pat. No. 4,345,973 discloses a procedure for dehydration of aqueous ethanol which involves heating an aqueous ethanol solution to the vapor state and then allowing the vapor to contact a dehydrating agent, such as corn starch or corn hulls, that had previously been stripped of water by heating. This procedure, like the azeotropic distillation processes, depends on vapor dehydration reactions. According to the patented process, the water absorbing material must first be prepared for use by heating. This again requires considerable energy input. The characteristics of the absorbents which cause water to be removed from the ethanol-water mixtures also result in the extracted water being strongly held or bound by the absorbents. Thus, to prepare the dehydration agents for use according to the '973 patent, energy far beyond that required to merely bring the absorbent mass to the vaporization temperature of water is required if removal of water therefrom is to be accomplished in a reasonable time.

The procedure of the '973 patent depends on contact of vapor with a solid and thus is a vapor dehydration procedure. Since small quantities of liquid occupy a large volume in the vapor state, the vapor dehydration procedure involves high energy costs to accomplish and maintain the materials in vapor state and also presents problems of achieving efficient contact of the vapor with the absorption agent. Thus, one practicing the patented vapor dehydration procedure must slow the passage of vapor through the absorbent to allow adequate contact time or be satisfied with only partial dehydration or utilize sufficient capital intensive equipment to handle large vapor volumes.

Similarly, U.S. Pat. No. 4,333,740 relates to a process for the separation of water from ethanol. According to this patent, corn meal is used to absorb the water present with the ethanol. To make the corn meal suitable for use it is heated with 50° C. to 60° C. air to dryness. According to the patent, the corn meal exhibits a capacity to absorb only about 0.0225 gram water per gram of dry corn meal.

Both of the above prior art patents require that the absorption agent be heated and dried before use to remove water from ethanol. Further, such dried or dehydrated vegetable materials having high surface area, such as starch, present explosion hazards and extreme care must be exercised in transporting and using such dehydrated solids. The explosion hazards constitute serious drawbacks with respect to the above prior art methods of removing water from alcohols.

U.S. Pat. No. 3,235,610 discloses a procedure for dehydrating moist organic liquids using ion exchange resins. This patent recognizes that initial dehydration of resin and subsequent regeneration of that resin is essential. Regeneration is accomplished according to that patent by heat.

It is therefore a principal object of this invention to provide methods for removing water from mixtures of alcohol and water which possess advantages over prior art methods.

Another object of this invention is to provide improved methods for removing water from alcohol-water mixtures which can be conducted in liquid state below the vaporization temperature of the alcohols.

An additional object of the invention is to provide processes for removing water from water-alcohol mixtures utilizing readily available absorbents which can be used for more than one absorption cycle without moving the absorbents from one vessel to another between cycles and without applying heat to the absorbents between cycles.

It is an object of the present invention to provide an alcohol dehydration process that uses ion exchange resin as an absorbent and avoids the necessity of vaporizing moist alcohol prior to the dehydration and avoids vaporization of moisture from the saturated column subsequent to the dehydration.

Another object is to provide a resin regeneration cycle that takes little longer than that required for the resin to be used in its working cycle.

A further object is to provide resin dehydration and regeneration cycles that can be performed at ambient and subambient temperatures.

The present invention involves a process for removing water from mixtures of alcohols and water by contacting such a mixture with an ion exchange resin of either the cation or anion type. Prior to use for alcohol dehydration, the ion exchange resin itself is dehydrated if necessary or desired by contacting it with methanol, propanol, isopropanol, acetone or other like low molecular weight hydrophilic solvents. After use for alcohol dehydration, the ion exchange resin is regenerated by contacting it with these dehydrating/regenerating agents.

An ion exchange resin useful in accordance with this invention is an insoluble support containing polar functional groups holding a cation or anion which can be exchanged with a free ion in solution. These insoluble supports are usually synthetic polymers, in bead form, crosslinked sufficiently to give insolubility and rigidity to the structure. A common use for ion exchange resins is to remove ions of specific types from solutions contacting the resins.

Ion exchange resins differ from molecular sieves in the mode used for separation of a desired species. Molecular sieves have uniform channels of specific size that trap small molecules based on the physical dimensions of the molecule. Indeed, a prominent use of molecular sieves is to dry gases or organic solvents by causing the small water molecules to contact and become trapped within the molecular sieve, while larger molecules are excluded by their bulk. Ion exchange resins, by contrast, depend on electrical charge of a species to effect entrapment. Thus, trivalent aluminum ion has a strong affinity for a cation resin and can easily replace a monovalent ion, such as sodium, not because of the size of the aluminum ion compared to sodium ion, but principally because of the differences between the charges on the ions.

Representative ion exchange resins suitable for use in the present invention are Dowex® 50W×2, sodium form, Dowex® 50W×8, hydrogen form, Dowex® 1×2, chloride form, Dowex® 1×4, chloride form, Dowex® 1×8, chloride form, all available from Dow Chemical USA, Midland, Mich., Duolite® C-26, sodium form, available from Diamond Shamrock, Cleveland, Ohio, Rexyn® 101 hydrogen form, Rexyn® 201 chloride form, available from Fisher Scientific Co., Fair Lawn, N.J., and Amberlite® IR-120 hydrogen form, available from Rohm & Haas Co., Philadelphia, Pa.

The above are only a few examples of types of ion exchange resin that can be employed. Many types of resins, in various cationic and anionic forms, can be used in accordance with the invention.

In a typical continuous dehydration operation, including the regeneration step, an ion exchange resin is placed into a vessel equipped with a bottom distributor plate and inlet and outlet openings at the bottom and top, respectively. Ion exchange resins, especially those with low crosslinkage, swell considerably during the water absorption stage of the process. Therefore, any column of ion exchange resin when packed in a partially or entirely dehydrated state should have considerable void space to allow for later expansion of the packing. The material to be dehydrated is made to flow through the bed until the efficiency of water adsorption by the ion exchange resin decreases below a predetermined or acceptable limit. At this point, excess material undergoing dehydration by the ion exchange resin is removed therefrom. The ion exchange resin is then regenerated or reactivated by slowly pumping or percolating a regenerating agent such as methanol through the bed. The regeneration efficiency is a function of the flow rate of the regenerating agent. A relatively slow flow rate increases the contact time of the regenerating agent with the spent ion exchange resin and affords greater moisture removal per unit volume of regenerating agent. A flow rate which provides at least a 20 minute contact time between the regenerating agent and the ion exchange absorbent is generally preferred. The moisture exiting from the column containing the resin absorbent can be monitored. The regeneration operation is continued until the moisture level of the column effluent falls to a low value, such as 0.2% water (weight/volume). After the regenerating agent remaining in the resin column is drained therefrom, the ion exchange resin is again ready to be used for dehydration purposes.

The regeneration procedure can be conducted in either a batch or continuous manner. For example, in a typical batch regeneration procedure, spent ion exchange resins to be regenerated are placed into a vessel and a regenerating agent preferably containing not more than 0.1% by weight water is brought into contact with the ion exchange resin. The amount of regenerating agent used generally ranges from about at least 2 to 10 milliliters for each gram of the ion exchange resin undergoing regeneration. A large ratio of regenerating agent to the ion exchange resin, such as 10 or more to 1, milliliters per gram, is generally preferred to desorb the maximum amount of water. Occasional stirring or other agitation is desirable to improve regeneration efficiency. The regenerating agent is permitted to remain in contact with the ion exchange resin for periods of from about 0.1 to 24 hours. The extent of water desorbed from the ion exchange resin increases with extended contact times but with decreasing efficiency. A twenty-four hour contact or equilibration period removes most of the water from the spent ion exchange resin, but a four-hour equilibration period usually removes over 90% of the water removed in 24 hours. Thus, from a practical standpoint, a four-hour equilibration or contact period is generally sufficient. After contact with the regenerating agent for a desired period, the ion exchange resin is separated from the bulk of the regenerating agent by filtration or centrifugation. It is not necessary to treat the regenerated ion exchange resin further and it can then be used for dehydration operations, although in some applications it may be desirable to remove residual solvent by methods known to those skilled in the art. Regeneration efficiency is less with a regenerating agent containing substantial amounts of water and it is thus preferred to employ these regenerating agents in substantially anhydrous condition, i.e. containing not more than about 0.1% by weight water.

The absorption column can be of any suitable dimensions that provide efficient flow of liquid past a solid absorbent, but a ratio of diameter:length in the range 1:5 to 1:40 is preferred. A frit or mesh on the discharge end is used to keep packing in the column during the elution cycles. The ends of the column have suitable fittings attached to permit pumping of liquids through the column and, if appropriate, to attach a purge gas inlet.

The direction of flow through the column is not critical to achieving the desired results. Upflow more efficiently removes air entrapped during packing. The column can be operated over a range of temperatures, from subambient up to a temperature slightly below the vaporization temperature of the alcohol undergoing dehydration.

The dehydration methods of the present invention can be advantageously employed to remove water from mixtures of water and alcohols, such as ethanol, 1-propanol and 2-propanol, and other aqueous mixtures, such as moist non-polar organic compositions such as petroleum fluids.

The following examples illustrate the invention and the advantages thereof.

EXAMPLE 1

The ion exchange resin Dowex 50X2 in the sodium form was dried in a forced air oven at 105° C. A quantity of this dried resin, 11.94 grams, was packed into a column. Ethanol containing 5.82% water was pumped through the column, bottom to top, at room temperature, at a rate of 0.82 milliliter per minute. The first 10 milliliters of effluent contained 0.53% water. The second 10 milliliters contained 1.55% water.

This example demonstrates the ability of dry ion exchange resin to selectively absorb water from moist ethanol in the liquid state at room temperature.

EXAMPLE 2

A packing of 25.1 grams Dowex 50X2, calcium form, of 48.0% air oven solids was loaded into a column. The moist resin was treated to remove moisture bound on and throughout the resin by passing methanol therethrough. The first 10 milliliter aliquot of methanol effluent contained 51.5% water. The second, third and fourth ten milliliter aliquots contained 26.7%, 11.0% and 8.3%, respectively. A 140 milliliter volume of methanol through the column removed 13.07 grams water or 1.08 grams water for each gram of resin, dry basis.

The methanol removed moisture, nearly quantitatively, from the ion exchange resin.

EXAMPLE 3

The methanol inlet to the bottom of the column dehydrated in Example 2 was removed and excess methanol allowed to drain from the column. Nitrogen gas was then purged gently through the resin column for 30 minutes. Then ethanol containing 6.33% water was pumped to the bottom of the column and through the dehydrated resin column. The first 10 milliliter effluent contained 0.17% water as determined by Karl Fischer titration and 71.9% methanol, as measured by gas chromatography. The next 10 milliliters contained 0.13% water and 19% methanol. The third 10 milliliters collected contained 1.04% water and 1.9% methanol.

Example 3 shows that ion exchange resin, previously dehydrated with methanol, can effectively dehydrate aqueous ethanol.

EXAMPLE 4

25.13 grams as is or 12.05 grams dry basis Dowex 50X2 ion exchange resin, sodium form, was placed into a 2.5 centimeter diameter column to give a bed height of 11.2 centimeters. Isopropyl alcohol was passed through the column at 1.0 milliliter per minute. The first 10 milliliters effluent contained 31.4% water, the second 14.4%. The first 30 milliliters of isopropyl alcohol removed 5.66 grams water. An additional 4.85 grams water was removed with passage of an additional 160 milliliters isopropyl alcohol.

The isopropyl alcohol treated column was tested for its ability to dehydrate ethanol by pumping ethanol containing 6.02% water through the column. The first 10 milliliters effluent contained 0.78% water. Fifty-four percent of that effluent was isopropyl alcohol carryover. The next 10 milliliters effluent contained 1.84% water, with 5.1% of the effluent being isopropyl alcohol.

EXAMPLE 5

The ion exchange resin, Dowex 50X2, sodium form, was placed into a column to test the dehydration ability of n-propyl alcohol. The resin, 25.0 grams as is (11.89 grams dry basis), was treated at room temperature with n-propyl alcohol containing 0.42% water, by pumping the alcohol through the column at 1.04 milliliters per minute. The first 10 milliliter aliquot contained 30.6% water; the second 11.3% water. The proportion of water decreased in each additional aliquot. A volume of 230 milliliters of n-propyl alcohol removed 82% of the resin's initial moisture.

The resin, after being drained and purged of excess n-propyl alcohol, was tested for its ability to dehydrate ethanol containing 5.92% water. The first 10 milliliter aliquot contained 1.25% water. Of the first 10 milliliter effluent, 3.3 milliliters was n-propyl alcohol carryover. The second 10 milliliters contained 0.72 milliliter n-propyl alcohol carryover and 2.32% water.

This example shows that n-propyl alcohol can be used to regenerate ion exchange resins.

EXAMPLE 6

Acetone was pumped through a column containing Dowex 50X2, sodium form. The column, containing 25.0 grams as is resin (12.0 grams dry basis) had 91% of its moisture removed by 150 milliliters acetone. The first 10 milliliter aliquot contained 35.2% water, the second 10.4% water.

EXAMPLE 7

Another column was packed with 25.0 grams as is (10.84 grams dry basis) Dowex 50X4, hydrogen form, ion exchange resin. Methanol pumped through the column removed moisture to the extent that the first 10 milliliter effluent contained 54.7% water. The second 10 milliliters contained 52.9% water, the third 12.8% water. After enough methanol had been passed that the effluent contained less than 0.1% water, the methanol was drained and the column purged with nitrogen. When ethanol containing 5.71% water was pumped through the column the first 10 milliliters of effluent contained 5.60 milliliters ethanol and 0.2% water. The next 10 milliliters contained 7.53 milliliters ethanol, 0.02% water, with the balance being methanol carryover. The third 10 milliliters contained 9.40 milliliters ethanol and 0.08% water. The fourth 10 milliliters effluent contained no trace of methanol and only 0.09% water.

EXAMPLE 8

The methanol treatment and subsequent ethanol dehydration was performed using a column containing the anion exchange resin Rexyn 201, chloride form, available from Fisher Scientific Co., Fair Lawn, N.J. The resin, 25.0 grams as is (21.12 grams dry basis), after methanol dehydration, was tested with ethanol containing 5.83% water. The first 70 milliliters effluent contained only 0.90% water. The 70 milliliters of effluent contained 9.15 milliliters methanol that was carried over in the early portion of effluent. Had the first 10 milliliters of effluent been discarded, 50 milliliters of product containing less than 0.5% water and less than 9% methanol would have been collected.

Those modifications and equivalents which fall within the spirit of the invention are to be considered a part thereof.

What is claimed is:

1. A process for removing water from a water-containing alcohol which comprises passing a low molecular weight hydrophilic liquid dehydrating agent through a bed of ion exchange resin to remove water therefrom, then passing a water-containing alcohol through said bed of ion exchange resin until the water-absorbing capacity of the ion exchange resin falls to a predetermined level.

2. A process in accordance with claim 1 wherein the water-containing alcohol is ethanol.

3. A process in accordance with claim 1 wherein the liquid dehydrating agent is selected from the group consisting of methanol, propanol, isopropanol and acetone.

4. A process for removing water from a water-containing alcohol which comprises passing a water-containing alcohol through a bed of ion exchange resin until the water-absorbing capacity of the ion exchange resin falls to a predetermined level, then passing a liquid regenerating agent through said ion exchange resin bed to restore the water absorbing capacity.

5. A process in accordance with claim 4 wherein the water-containing alcohol is ethanol.

6. A process in accordance with claim 4 wherein the liquid regenerating agent is selected from the group consisting of methanol, propanol, isopropanol and acetone.

7. A process for removing water from a water-containing alcohol which comprises passing a water-containing alcohol through a bed of ion exchange resin until the water absorbing capacity of the ion exchange resin falls to a predetermined level and then passing a liquid regenerating agent through said ion exchange resin bed to restore the water absorbing capacity and then again passing water-containing alcohol through said ion exchange resin bed.

8. A process in accordance with claim 7 wherein the water-containing alcohol is ethanol.

9. A process in accordance with claim 7 wherein the liquid regenerating agent is selected from the group consisting of methanol, propanol, isopropanol and acetone.

* * * * *